United States Patent [19]

Furuya et al.

[11] Patent Number: 4,767,953

[45] Date of Patent: Aug. 30, 1988

[54] ELECTRODE DEVICE FOR ELECTROMAGNETIC FLUID FLOW APPARATUS

[75] Inventors: Nagakazu Furuya, No.4-3-31, Ohte 2-chome; Satoshi Motoo, No.5-24, Takeda 3-chome, both of Kofu-shi, Yamanashi, Japan

[73] Assignees: Tanaka Kikinzoku Kogyo K.K.; Nagakazu Furuya; Satoshi Motoo, all of Japan

[21] Appl. No.: 34,437

[22] Filed: Apr. 3, 1987

[51] Int. Cl.[4] .............................................. H02K 44/00

[52] U.S. Cl. ...................................... 310/11; 310/306; 313/631

[58] Field of Search .................... 310/11, 306; 417/50; 313/631

[56] References Cited

U.S. PATENT DOCUMENTS

| | | | |
|---|---|---|---|
| 3,381,148 | 4/1968 | Creedon | 310/306 |
| 3,416,013 | 12/1968 | Poncelet | 310/11 |
| 3,477,878 | 11/1969 | Hughes | 310/306 X |
| 3,514,643 | 5/1970 | Senkewich | 310/306 |
| 3,553,502 | 1/1971 | Kasahara | 310/11 |
| 3,980,907 | 9/1976 | Nakamura | 310/11 |
| 3,999,089 | 12/1976 | Barros | 310/11 |
| 4,151,423 | 4/1979 | Hendel | 310/11 X |
| 4,268,765 | 5/1981 | Hoover | 310/11 |
| 4,341,965 | 7/1982 | Okuo | 310/11 |
| 4,447,748 | 5/1984 | Young | 310/11 |

OTHER PUBLICATIONS

Grant & Hackh's; Chemical Dictionary; R. Grant et al.; McGraw-Hill Book Co.; New York-Toronto; 1987; p. 293.

Chambers Science and Technology Dictionary; T. C. Collocott MA, et al.; W & R Chambers Ltd, 1971; Edinburgh, Gr. Britain, No. 263.

*Primary Examiner*—R. Skudy
*Attorney, Agent, or Firm*—Stefan J. Klauber

[57] ABSTRACT

An electrode device for an electromagnetic fluid flow apparatus, comprising a pair of electrodes which face a pathway of an electrical conductive fluid, and a magnet which faces the pathway and effects a magnetic field in a direction perpendicular to the flow direction of the electrical conductive fluid and to a straight line connecting the two electrodes. Each electrode is made of a hydrophobic carrier with pores of at most 1 $\mu$m pore size, the hydrophobic porous carrier having electrical conductivity, gas permeability and liquid impermeability. A gas generated from the electrode may be discharged from the rear surface of the electrode to the outside without releasing from the surface of the electrode into the electrical conductive fluid.

11 Claims, 3 Drawing Sheets

VOLTAGE BETWEEN ELECTRODES EXCLUDING SEAWATER RESISTANCE (V)
2.5
2
1.5
1
0.5
0
b
a
0
50
100
150
200
CURRENT DENSITY (A/dm2)

VOLTAGE BETWEEN ELECTRODES EXCLUDING SEAWATER RESISTANCE (V)
-1.0
-0.5
0
c
d
0
100
200
CURRENT DENSITY (A/dm2)

ELECTRODE DEVICE FOR ELECTROMAGNETIC FLUID FLOW APPARATUS

BACKGROUND OF THE INVENTION

The present invention relates to an electrode device for an electromagnetic fluid flow apparatus which is capable of flowing an electrical conductive fluid by turning on an electric current and of converting kinetic energy of a flowing electric current and of converting kinetic energy of a flowing electrical conductive fluid into electrical energy, and, more particularly, to an electrode device for an electromagnetic fluid flow apparatus, which is capable of discharging a gas generated from an electrode portion to the outside therefrom without releasing the gas into the electrical conductive fluid.

In the prior art, when an electrical conductive fluid is moved, a variety of pumps have been used. In these conventional pumps, electrical energy is converted into mechanical energy by using an electric motor or the like, and the electrical conductive fluid is moved by this mechanical energy. On the other hand, an apparatus which directly imparts the electrical energy to the electrical conductive fluid as kinetic energy in the magnetofluid dynamics manner, is, for instance, a superconductive linear motor boat. In turn, an apparatus which produces the electrical energy from the kinetic energy, is an MHD power generator, and a sensor of this kind is an electromagnetic flowmeter.

However, in these apparatuses, since, in order to directly pass an electric current into the electrical conductive fluid, a plate electrode made of platinum or the like is used, a reaction gas is generated from the surface of the electrode. For example, in the superconductive linear motor boat, the seawater is electrolyzed to produce chlorine gas and hydrogen gas which cause environmental pollution. Further, the generated gas covers the electrode, and accordingly it can not be driven in a high current density.

Therefore, in the conventional examples, since the electrode made of the platinum plate is used, these apparatuses become expensive. Further, in a conventional electrode device for an electromagnetic fluid flow apparatus, since the electric current is flowed in the electrical conductive fluid, the electrolysis of the fluid is inevitably conducted, and hence the energy loss is large. Further, the gas generated from the electrode portion is emitted into the electrical conductive fluid, and the generated gas covers the surface of the electrode. Hence, it is difficult to improve the current density.

SUMMARY OF THE INVENTION

Accordingly, an object of the present invention is to provide an electrode device for an electromagnetic fluid flow apparatus, free from the aforementioned defects and disadvantages of the prior art, which is capable of discharging a gas generated from an electrode portion to the outside therefrom without releasing the gas into the electrical conductive fluid and of obtaining quite a high current density, and which is economical in manufacturing.

In accordance with one aspect of the invention, in an electrode device for an electromagnetic fluid flow apparatus, comprising a pair of electrodes electrically connected to an electric power source, which are arranged at a certain distance away from each other facing a pathway of an electrical conductive fluid, and a magnet which is arranged between the electrodes, facing the pathway, and effects a magnetic field in the direction perpendicular to the flow direction of the electrical conductive fluid and to a straight line connecting the two electrodes, the improvement is provided wherein the electrodes are made of a hydrophobic porous carrier with pores of at most 1 μm pore size, having electrical conductivity, gas permeability and liquid impermeability.

In a preferred embodiment of the present invention, the hydrophobic porous carrier is provided with a porous membrane having hydrophobic and hydrophilic properties on its surface, contacting the electrical conductive fluid and this porous member may be electrically conductive. The porous membrane may be formed a hydrophilic porous membrane on its inner surface, contacting with the electrical conductive fluid.

In another preferred embodiment of the present invention, the gas generated from the hydrophobic porous carrier of one electrode is preferably circulated to the electrical conductive fluid via the hydrophobic porous carrier of the other electrode.

The hydrophobic porous carrier is preferably the Knudsen diffusion membrane, thereby improving the gas permeability efficiency and increasing the strength.

In the porous membrane having the hydrophobic and hydrophilic properties, the hydrophobic portions and the hydrophilic portions are preferably formed in a minute reticulate pattern.

Further, since minute particles of platinum or the like are dispersed as a catalyst on the hydrophilic porous membrane, the amount of the electrode catalyst of platinum or the like may be greatly reduced.

In the electrode device for the electromagnetic fluid flow apparatus, the electric current is passed from an electric power source to one electrode and the electric current flows from the one electric to the other electrode through the electrical conductive fluid.

Then, the electrical conductive fluid receives a drive force in the direction as indicated by an arrow "A" of FIG. 1 by virtue of the magnetic field effected by the magnetic arranged between the two electrodes, facing the pathway of the electrical conductive fluid.

In this case, when the electrical conductive fluid is a sulfuric acid solution, the hydrogen gas ($H_2$) obtained by coupling two hydrogen ions ($H^+$) is generated from one electrode. However, since the electrode comprises a hydrophobic porous carrier having pores of at most 1 μm pore size and a porous membrane having hydrophobic and hydrophilic properties, which is attached to the internal surface of the hydrophobic porous carrier, contacting the electrical conductive fluid, the hydrogen gas is discharged from the hydrophobic porous carrier to the outside by the action of the hydraulic pressure and so forth.

Other and further objects, features and advantages of the invention will appear more fully from the following description in connection with the preferred embodiments thereof with reference to the accompanying drawings.

DESCRIPTION OF THE PREFERRED EMBODIMENTS

Figure 1:
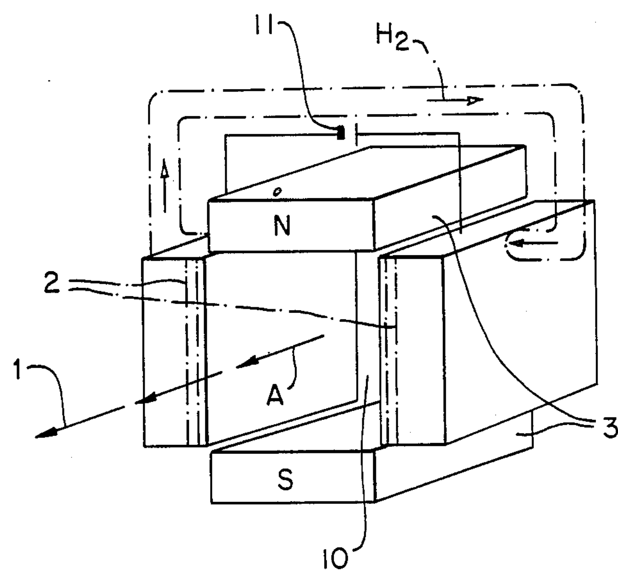
FIG. 1 is a perspective view of an electrode device for an electromagnetic fluid flow apparatus according to the present invention.
Figure 2:
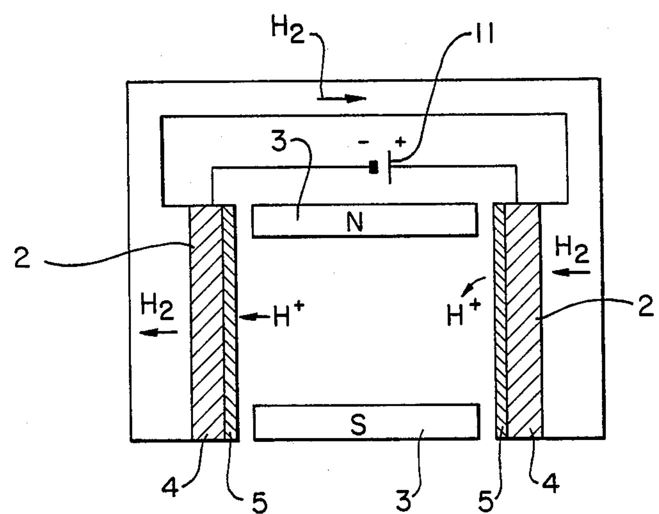
FIG. 2 is a schematic longitudinal cross sectional view of FIG. 1.
Figure 3:
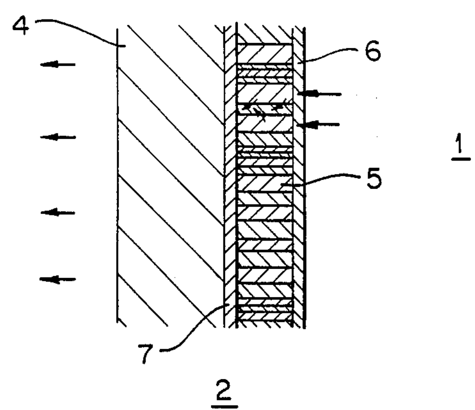
FIG. 3 is an enlarged cross sectional view of an electrode shown in FIG. 1.

Referring now to the drawings, wherein like reference numerals designate similar or corresponding components throughout the different figures, there is shown in FIGS. 1-3 one embodiment of an electrode device for an electromagnetic fluid flow apparatus according to the present invention.

In the drawings, a pair of electrodes 2 are electrically connected to an electric power source 11 and are arranged at a certain distance away from each other, facing a pathway 10 of an electrical conductive fluid 1. A pair of magnets 3 each having N and S poles are arranged between the electrodes 2 and face the cylindrical pathway 10 of the electrical conductive fluid 1.

Each electrode 2 comprises a hydrophobic porous carrier 4 with pores of at most 1 μm pore size, which posesses gas permeability and liquid impermeability, and a porous membrane 5 having hydrophobic and hydrophilic properties, which is attached to the internal surface of the hydrophobic porous carrier 4 in contact with the electrical conductive fluid 1.

The hydrophobic material of the hydrophobic porous carrier and the porous membrane is selected from the group consisting of fluorides such as polytetrafluoroethylene, organic synthetic materials such as polyethylene and polyoropylene, fluorine-treated materials of these organic synthetic materials and materials obtained by treating the porous materials made of these organic synthetic materials by a hydrophobic agent.

The hydrophobic porous carrier 4 having gas permeability and liquid impermeability includes at least 50% of conductive carbon blacks and is obtained by binding the conductive carbon blacks by using a fluororesin such as polytetrafluoroethylene (hereinafter referred to as PTFE) so that the hydrophobic porous carrier 4 may have pores of at most 1 μm pore size. The porous membrane 5 having the hydrophobic and the hydrophobic properties, which is formed on one surface of the hydrophobic porous carrier 4 in order to contact the electrical conductive fluid 1, comprises conductive and hydrophobic carbon blacks bound by a fluororesin such as PTFE and conductive and hydrophilic carbon blacks on which a catalytic metal such as platinum is carried and which is bound by a fluororesin such as PTFE so that the conductive and hydrophobic carbon blacks fluororesin binding may be connected to form a minute reticulate pattern.

The hydrophobic porous carrier 4 and the porous membrane 5 may include minute particles of a conductive metal such as graphite carbon, Ni, Mn, Co, an oxide thereof and a carbide thereof instead of the carbon blacks in order to impart conductivity or catalytic function.

Further, the hydrophobic porous carrier 4 and/or the porous membrane 5 may include minute particles made of a material such as Ni, Ti, Mn, Co, a metal of the platinum group, an alloy of metals of the platinum group, carbon, a carbide, a nitride, an oxide and a fluoride and oxides and carbides Ni, Mn, Co metals of the platinum group alloys of the metals group Fe, W and Ti. For instance, as the metals of the platinum group, Pt, Pd, Ir, Rh, Ru and the like may be used, and, as the carbides, SiC and WC may be used. Further, as the nitrides, silicon nitride and tungsten nitride may be used, and, as the oxides, $Fe_2O_3$, $PdO_2$, $IrO_2$, $RuO_2$, TiO, NiO, $SiO_2$, $A1_2O_3$ and $ZrO_2$ may be used. As the fluorides, carbon fluorides (CnFm) may be used.

As shown in FIG. 3, in this embodiment, when the porous membrane 5 having both hydrophobic and hydrophilic properties contacts the electrical conductive fluid 1, the electrical conductive fluid 1 permeates the hydrophilic portions of the porous membrane 5 while the electrical conductive fluid 1 does not permeate the hydrophobic portions of the porous membrane 5. Accordingly, the electrical conductive fluid 1 is readily subjected to the catalytic reaction in the hydrophilic portions of the porous membrane 5. The gas generated in the porous membrane 5 by the catalytic reaction is discharged from the hydrophobic porous carrier 4 to the outside by receiving the hydraulic pressure of the electrical conductive fluid side. If a hydrophilic porous membrane 6 is formed over the surface of the porous membrane 5, the generated gas is discharged from the hydrophobic porous carrier 4 to the outside through the hydrophobic portions of the porous membrane 5 in the absence of the hydraulic pressure without returning to the electrical conductive fluid side. In a preferred embodiment, a current collector 7 such as an electrical conductive reticulation, a perforated plate and a grooved plate may be arranged between the hydrophobic porous carrier 4 and the porous membrane 5.

The pair of electrodes 2 are preferably connected to each other by a gas circulation tube so that the gas generated at one electrode 2 may be circulated from the hydrophobic porous carrier 4 of the one electrode 2 into the electrical conductive fluid 1 via the hydrophobic porous carrier 4 of the other electrode 2.

In this embodiment, it is possible to produce a variety of gases at one electrode, and, in turn, in order to effectively use the gas generated at the one electrode at the other electrode, some combinations of the gas generation and the gas consumption at the two electrodes may be designed by using platinum, ruthenium oxide or the like, as follows.

(1) hydrogen gas generation—hydrogen gas consumption;

(2) chlorine gas generation—chlorine gas consumption; and (3) oxygen gas generation—oxygen gas consumption.

Further, in this embodiment, one electrode may be made of the electrode 2 according to the present invention and the other electrode may be a metallic electrode.

Further, like a fuel cell, hydrogen and oxygen (air) are supplied from the outside to the electrodes and generation of electricity may be carried out as follows.

(4) hydrogen gas consumption—oxygen gas (air) consumption;

(5) hydrogen gas consumption—chlorine gas consumption; and (6) hydrogen gas consumption—bromine gas consumption.

Figure 6:
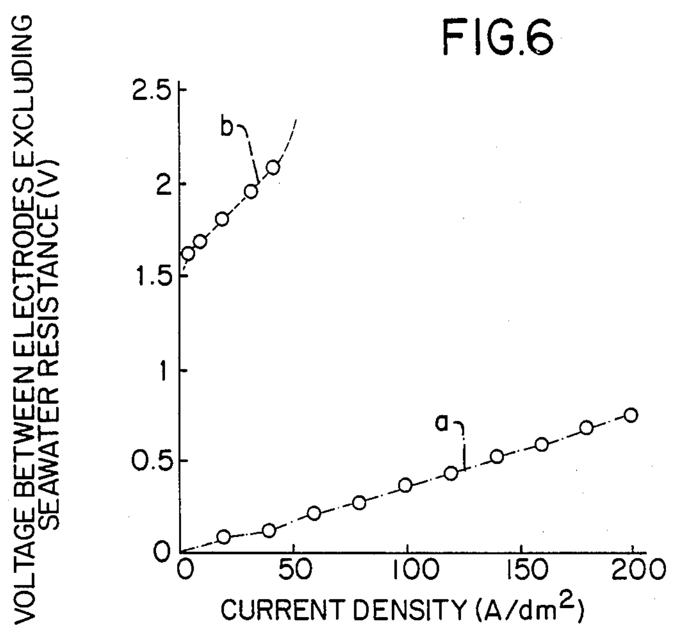
FIG. 6 is a graphical representation of performance of an electrode device (hydrogen gas generation—hydrogen gas consumption) according to the present invention as compared with that of a conventional electrode device.
Figure 7:
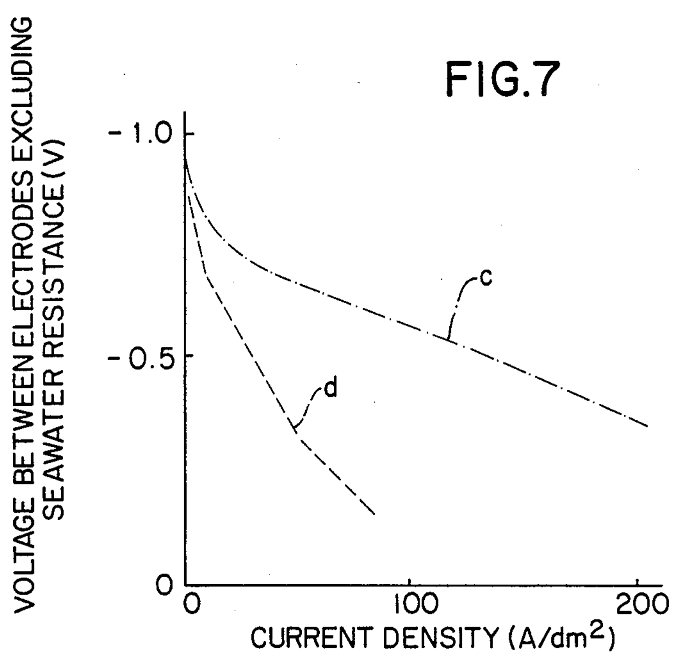
FIG. 7 is a graphical representation of performance comparison test of another electrode device (hydrogen gas consumption—oxygen gas consumption) according to the present invention as compared with a conventional one (hydrogen gas consumption—air consumption).

In FIG. 6, there is graphically shown a performance curve "a" of an electrode device (hydrogen gas generation—hydrogen gas consumption) according to the present invention as compared with a curve "b" of a conventional platinum electrode device, in which an amount of platinum carried on the electrodes of the present invention is 56 $mg/dm^2$, and the performance test is conducted under the conditions of a temperature of 25° C., a pressure of an atmospheric pressure and an electrical conductive fluid of a simulated seawater having a primary salt concentration of 3%. From FIG. 6, it is readily understood that, according to the present invention, a quite high current density can be obtained compared with that of the conventional electrode device. In FIG. 7, there is graphically shown a performance curve "c" of another electrode device (hydrogen gas consumption—oxygen gas consumption) according to the present invention as compared with a curve "d" of another conventional electrode device (hydrogen gas consumption—air consumption), in which the performance comparison test is carried out under the same conditions as those of the test of FIG. 6. The same effects and advantages as those of the test of FIG. 6 can be obtained.

Further, in this case, the hydrophobic porous carrier 4 having gas permeability and liquid impermeability may comprise the Knudsen diffusion membrane, thereby improving the gas permeability rate and increasing the strength. In this embodiment, the waterproof pressure may be at least 30 $kg/cm^2$.

In the aforementioned electrode device for an electromagnetic fluid flow apparatus according to the present invention, first, when the electrodes are set as the input, the electric current is supplied to the electrodes in order to convert the electrical energy into kinetic energy, resulting in that the electrical conductive fluid is moved.

For instance, when this electrode device of the present invention is utilized as the drive means, the electrode device functions in the same manner as a linear motor.

In this case, when the electric current is supplied to the electrodes 2 arranged facing the pathway 10 of the electrical conductive fluid 1, that is, the electrodes in contact with the seawater, the electrical current flows from one electrode 2 to the other electrode 2 via the seawater. Then, the seawater receives a driving force in the direction indicated by an arrow "A" of FIG. 1 by virtue of the magnetic field effected by the magnets 3 arranged, like the electrodes 2, facing the pathway 10 of the seawater. Consequently, the boat is moved forward by the counteraction of the moving seawater. In this case, by changing the flowing direction of the electric current or turning off the electric current, the changing of the moving directions of the boat or the stopping of the boat can be readily controlled.

As the electric current is supplied to the electrodes 2, the hydrogen gas ($H_2$) which is obtained by coupling the two hydrogen ions ($H^+$), generated from the surface of one of the electrodes 2. However, since the electrode 2 comprises the hydrophobic porous carrier 4 having pores of at most 1 μm pore size and the porous membrane 5 having hydrophobic and hydrophilic properties, which is attached to the internal surface of the hydrophobic porous carrier 4 and which contacts the seawater, the hydrogen gas ($H_2$) generated from the electrode 2 is discharged from the hydrophobic porous carrier 4 to the outside by the action of the hydraulic pressure of the seawater. Of course, the gas generated from the electrode is preferably circulated and/or treated in a closed system and the leakage of the gas to the outside is preferably prevented.

Figure 4:
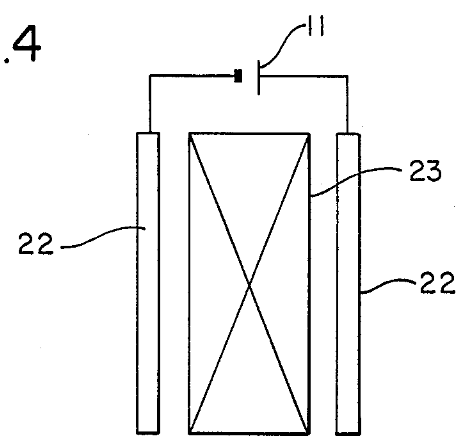
FIG. 4 is an schematic elevational view of another electrode device according to the present invention.

In FIG. 4, there is schematically shown another embodiment of an electrode device for an electromagnetic fluid flow apparatus according to the present invention. In this embodiment, a pair of electrodes 22 are arranged on opposite sides of a magnet 23 with certain spaces between the magnet 23 and the electrodes 22, and the electrodes 22 and the magnet 23 are arranged in a flat plane. A pair of the electrode devices described above may be disposed on both sides of a bottom of a boat in a flat form. In this case, there is no need to provide a cylindrical pathway for the seawater.

Figure 5:
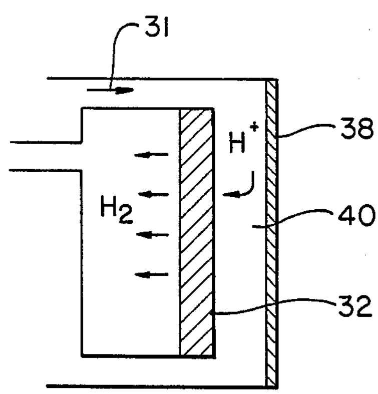
FIG. 5 is an enlarged schematic cross sectional view of still another electrode device according to the present invention.

In FIG. 5, there is shown still another embodiment of an electrode device according to the present invention. In this embodiment, a filter or an ion exchange membrane 38 is formed in front of an electrode 32, and the electrode 32 and the filter or the ion exchange membrane 38 define a pathway 40 for a refined electrical conductive fluid 31, that is, the pathway 40 extends along the surface of the electrode 32. In this case, even when the electrode 32 is used in the seawater, there is no fear at all that problems such as an inactivation of the catlyst of the electrode 32 by impurities or foreign materials and a loading of the pores of the electrode 32 will happen, and hence the durability of the electrode 32 is greatly improved. Further, in this embodiment, the energy conversion efficiency is almost the same as that of the aforementioned embodiments of the present invention.

In the above described electrode device according to the present invention, second, when the electrodes 2 are set as the output, the electrical conductive fluid 1 is passed through the pathway 10 in order to convert the kinetic energy into electrical energy by virtue of the electromagnetic induction, and thereby a certain electromotive force is obtained at the electrode 2.

In this case, it is possible to generate a variety of gases at one of the electrodes 2, and, in turn, in order to effectively use the gas generated at the one electrode 2 at the other electrode 2, some preferable combinations of the gas consumption and the gas generation at the two electrodes 2 may be designed by using platinum, ruthenium oxide or the like, as follows.

(1) hydrogen gas consumption—hydrogen gas generation;

(2) chlorine gas consumption—chlorine gas generation; and (3) oxygen gas consumption—oxygen gas generation.

Further, in this embodiment, one electrode may be the electrode of the present invention and the other electrode may be a metallic electrode.

Further, like a fuel cell, hydrogen and oxygen (air) are supplied from the outside to the electrodes, and generation of electricity may be possible as follows.

(4) hydrogen gas consumption—oxygen gas (air) consumption;

(5) hydrogen gas consumption—chlorine gas consumption; and (6) hydrigen gas consumption—bromine gas consumption.

For example, the electrode device of the present invention may be applied to an MHD power generator or a tidal power generator as an electromagnetic fluid power generator, and to a sensor such as an electromagnetic flowmeter using the same concept.

In any embodiment of the present invention, an electrode device for an electromagnetic fluid flow apparatus, which is capable of converting the electrical energy into kinetic energy or the kinetic energy into electrical energy, and which posseses superior conversion efficiency, can be obtained.

It is readily understood from the above description of the present invention that, in accordance with the electrode device of the present invention, the gas generated from the electrode portion is discharged to the outside without releasing from the surface of the electrode into the conductive fluid in the form of bubbles which cover the electrode, and therefore quite a high current density may be obtained.

Further, according to the present invention, it is possible to prevent the harmful gas generated at the electrode from releasing from the system to the outside, and accordingly problems such as environmental pollution can be effectively prevented.

Further, since the electrode catalyst is dispersed in the porous electrodes in the form of minute particles, the amount used of the catalyst of a precious metal such as platinum can be greatly reduced, and hence the electrode device of the present invention can be manufactured at a low price.

Although the present invention has been described in connection with its preferred embodiments, it is readily understood that the invention is not limited by any of the details of the description and that various changes and modifications may be made by a person skilled in the art without departing from the spirit and scope of the present invention.

What is claimed is:

1. In an electrode device for an electromagnetic fluid flow apparatus, comprising a pair of electrodes electrically connected to an electric power source, which are arranged at a certain distance away from each other, facing a pathway of an electrical conductive fluid, and a magnet which is arranged between the electrodes, facing the pathway, and effects a magnetic field in the direction perpendicular to the flow direction of the electrical conductive fluid and to a straight line connecting the pair of electrodes, the improvement wherein the electrodes are made of a hydrophobic porous carrier with pores of at most 1 $\mu$m pore size, having electrical conductivity, gas permeability and liquid impermeability, and said device being capable of discharging a gas generated from a portion of said electrodes to the outside therefrom without releasing the gas into the electrical conductive fluid and obtaining high current density.

2. An electrode device as defined in claim 1, wherein the gas generated from one of said electrodes can be discharged from a rear surface of one of said electrodes without discharging into the electrical conductive fluid.

3. An electrode device as defined in claim 1, wherein the gas generated from one of said electrodes can be supplied from a rear surface of one of said electrodes into the electrical conductive fluid.

4. An electrode device as defined in claim 1, wherein each of said electrodes is provided with a porous membrane having hydrophobic and hydrophilic properties on its surface, and contacting the electrical conductive fluid.

5. An electrode device as defined in claim 4, wherein the hydrophobic properties and the hydrophilic properties of the porous membrane are formed in a minute reticulate pattern.

6. An electrode device as defined in claim 4, wherein the porous membrane of one of said electrodes is provided with a hydrophilic porous membrane on its inner surface in contact with the electrical conductive fluid.

7. An electrode device as defined in claim 1, wherein the gas generated from the hydrophobic porous carrier of one of said electrodes is circulated to the hydrophobic porous carrier of the other one of said electrodes so as to be spent in the electrical conductive fluid by the electrode reaction of the other one of said electrodes.

8. An electrode device as defined in claim 4, wherein the hydrophobic porous carrier and the porous membrane include as an electrode catalyst, minute particles made of a material selected from the group consisting of Ni, Mn, Co, metals of the platinum group, alloys of the metals of the platinum group, and oxides and carbides of Ni, Mn, Co, metals of the platinum group, alloys of the metals of the platinum group, Fe, W and Ti.

9. An electrode device as defined in claim 4, wherein the hydrophobic porous carrier and the porous membrane include minute paticles made of a material selected from the group consisting of Ni, Ti, metals of the platinum group, carbons, carbides, nitrides, oxides and fluorides.

10. An electrode device as defined in claim 4, wherein hydrophobic material of the hydrophobic porous carrier and the porous membrane is selected from the group consisting of polytetrafluoroethylene, organic synthetic materials selected from polyethylene and polypropylene, fluorine-treated products of these organic synthetic materials, and products obtained by treating porous materials made of these organic synthetic materials by a hydrophobic agent.

11. An electrode device as defined in claim 1, wherein each of said electrodes is further provided with a current collector such as an electrical conductive reticulation, a perforated plate and a grooved plate between the hydrophobic porous carrier and the porous membrane.

* * * * *